(12) United States Patent
Wai

(10) Patent No.: US 7,195,287 B2
(45) Date of Patent: Mar. 27, 2007

(54) PIPE FITTING FOR LIQUID OR STEAM

(75) Inventor: Lai Lin Wai, Shatin (HK)

(73) Assignee: ON Yip Global Co., Ltd., Hong Kong (HK)

( * ) Notice: Subject to any disclaimer, the term of this patent is extended or adjusted under 35 U.S.C. 154(b) by 95 days.

(21) Appl. No.: 10/927,329

(22) Filed: Aug. 26, 2004

(65) Prior Publication Data

US 2005/0077723 A1 Apr. 14, 2005

(30) Foreign Application Priority Data

Oct. 14, 2003 (CN) .......................... 2003 1 0101202

(51) Int. Cl.
*F16L 19/08* (2006.01)
(52) U.S. Cl. ...................... 285/340; 285/39; 285/392
(58) Field of Classification Search ................ 285/340, 285/322, 323, 392, 104, 232, 39
See application file for complete search history.

(56) References Cited

U.S. PATENT DOCUMENTS

| | | | | | |
|---|---|---|---|---|---|
| 3,365,219 | A | * | 1/1968 | Nicolaus | 285/340 |
| 3,367,684 | A | * | 2/1968 | Anderson | 285/340 |
| 3,679,241 | A | * | 7/1972 | Hoffmann | 285/340 |
| 4,930,816 | A | * | 6/1990 | Biing-Yih | 285/321 |
| 4,993,755 | A | * | 2/1991 | Johnston | 285/315 |
| 5,496,076 | A | * | 3/1996 | Lin | 285/110 |
| 6,183,022 | B1 | * | 2/2001 | Guest | 285/322 |
| 6,464,266 | B1 | * | 10/2002 | O'Neill et al. | 285/340 |
| 2003/0111840 | A1 | * | 6/2003 | O'Neill et al. | 285/340 |
| 2004/0239115 | A1 | * | 12/2004 | Wilk et al. | 285/340 |

* cited by examiner

Primary Examiner—James M. Hewitt
(74) Attorney, Agent, or Firm—McDonnell Boehnen Hulbert & Berghoff LLP

(57) ABSTRACT

A fitting for liquid or steam piping, comprising: an elastic sealing ring; a locating sleeve placed around said sealing ring; an internal teethed lock ring located on the locating ring outer end face; an inner ring located outside of the internal teethed lock ring, the inner surface of the inner ring matching with the outer surface of the pipe to be coupled, the inner ring further including a tapered surface and external threads on the outer surface of the inner ring; an outer ring with threads on its internal surface for matching the external thread on said inner ring, as well as methods for connecting pipes using the fitting.

12 Claims, 3 Drawing Sheets

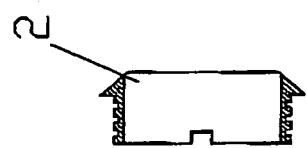
FIG. 2C
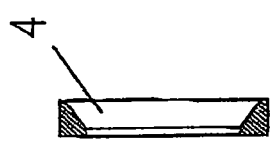
FIG. 2B
FIG. 2E
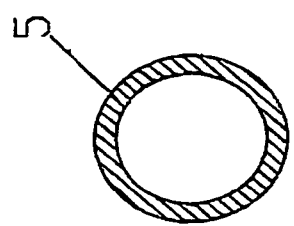
FIG. 2D
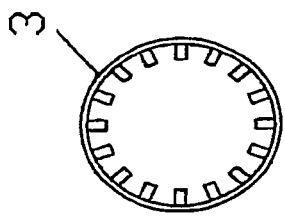
FIG. 2A
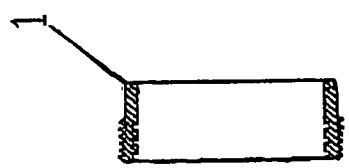

PIPE FITTING FOR LIQUID OR STEAM

FIELD OF THE INVENTION

This invention relates to pipe fittings for water mains or service pipe systems, and especially component parts thereof.

BACKGROUND OF THE INVENTION

Common pipe fittings for liquid (or steam) have internal threads on the inside surface of the pipe-receiving end of the fitting head, and external threads on the outside surface of the matching end of said pipe. Then, said threaded pipe end is screwed into said pipe fitting with the engagement of said internal thread of the said pipe and the external thread of said pipe. Since any thread has depth, the mechanical strength of said threaded end will be greatly weakened. Since the thread on the end of pipe fittings are typically coarsely finished, screwing a liquid (or steam) pipe into a fitting is met with resistance. A common wrench is not useful to tighten common pipe fittings. Due to the smooth and round pipe body. Therefore, a pipe wrench with specially made chops should be used for biting on the pipe body. In doing so, the pipe can be screwed into the fitting. After assembling, scars and deformations caused by said wrench chops remain on the pipe body.

Furthermore, when the assembled pipe, used for a considerable time is disassembled, the process is generally more difficult than assembling because, both threaded portions of the pipe and of the fitting bind tightly together due to rust, deformation and gluing etc. Therefore, after disassembling, the scars and deformations caused by said wrench chops will be made more serious. At the same time, it is possible the whole pipe will be broken at the threaded portion.

Overtime, different piping materials have been used such as: wrought iron (zinc plated), plastics (hard PVC), brass, brass with plastic coating, wrought iron with inner plastic coating, copper with outer nickel-plating and alloy. Even if the external surface of the pipes is plated or coated, they are still not suitable to be bitten by pipe wrench because none of the plating or coating layers can bear the terrible biting of the wrench chops and any layer will be destroyed after the biting of wrench chops. Even copper pipes or alloy pipes with hardnesses lower than the hardness of wrench chops, will exhibit ugly scars and deformations on the pipe surface after a pipe wrench is used on the pipes.

As a result, many fittings that do not match by threading have been developed. One such pipe is provided with an integral flange on the pipe end. This flange method is only suitable for pipes made of soft materials such as brass. Another such pipe utilizes a plastic pressing ring located on the external surface of the pipe end. This method is usually used on indoor drain systems. Though the above mentioned methods have eliminated threads from pipe ends, the connection between the pipe and the fitting is still achieved by threading. The difference lies in that the external thread is made on the external surface of the fitting, and the internal thread is made on the inner surface of a casing head which sleeved on the pipe. Although these methods can solve the problem of pipe surface being damaged by wrench chops, but they have limited applications since they are not suitable for wrought iron pipes, and because the construction of threaded casing heads is complex. Furthermore, the process for flanging and screwing are troublesome.

Another solution was to replace the internal thread of prior art fittings with an internal teethed lock ring so that pipe without end threads can be directly inserted through the internal teethed lock ring integrated on the fitting and can be kept in position. Once it is in position, it is impossible to disassemble the pipe. But in practice, pipe pre-assembly is absolutely necessary. If an assembled set can not be disassembled, it means there can be no pre-assembly and no repair work is permissible. Therefore, nobody uses this method nowadays.

SUMMARY OF THE INVENTION

An object of this invention is to provide a kind of pipe fitting for liquid or steam, which does not need to be threaded on the matching pipe end and that uses an internal teethed lock ring for connecting. The invention is suitable for pipes of any materials. The matching pipe can be inserted into said fitting freely and the coupled pipe can also be released freely.

For achieving above mentioned object, the fitting for liquid (or steam) of this invention comprising: an elastic sealing ring, which contacts the inner end face of said fitting head; a locating sleeve placed around said sealing ring; an internal teethed lock ring located on the outer end face of said locating ring; an inner ring located outside said internal teethed lock ring, the inner surface of the inner ring matches with the outer surface of the pipe to be coupled, a tapered surface is formed on the inner ring toward said internal teethed lock ring and external threads are made on the outer surface of the inner ring; an outer ring with threads on its internal surface for matching the external thread on said inner ring, the external cylindrical surface of the outer ring sliding matches said inner cylindrical surface of said traditional fitting head, the external thread on the external surface of the outer ring matches said internal thread of said traditional fitting head; For connecting a pipe to this inventive fitting, only to insert the pipe into this inventive fitting until a "click" is heard; For releasing the pipe, only to turn said inner ring at 180° with a special wrench.

BRIEF DESCRIPTION OF DRAWINGS

The construction of this invention will be described in details with reference to following drawings, in which:

FIGS. 2A to 2E depict main components of a fitting for liquid (or steam) of this invention;

DETAILED DESCRIPTION OF EMBODIMENTS

Figure 1:
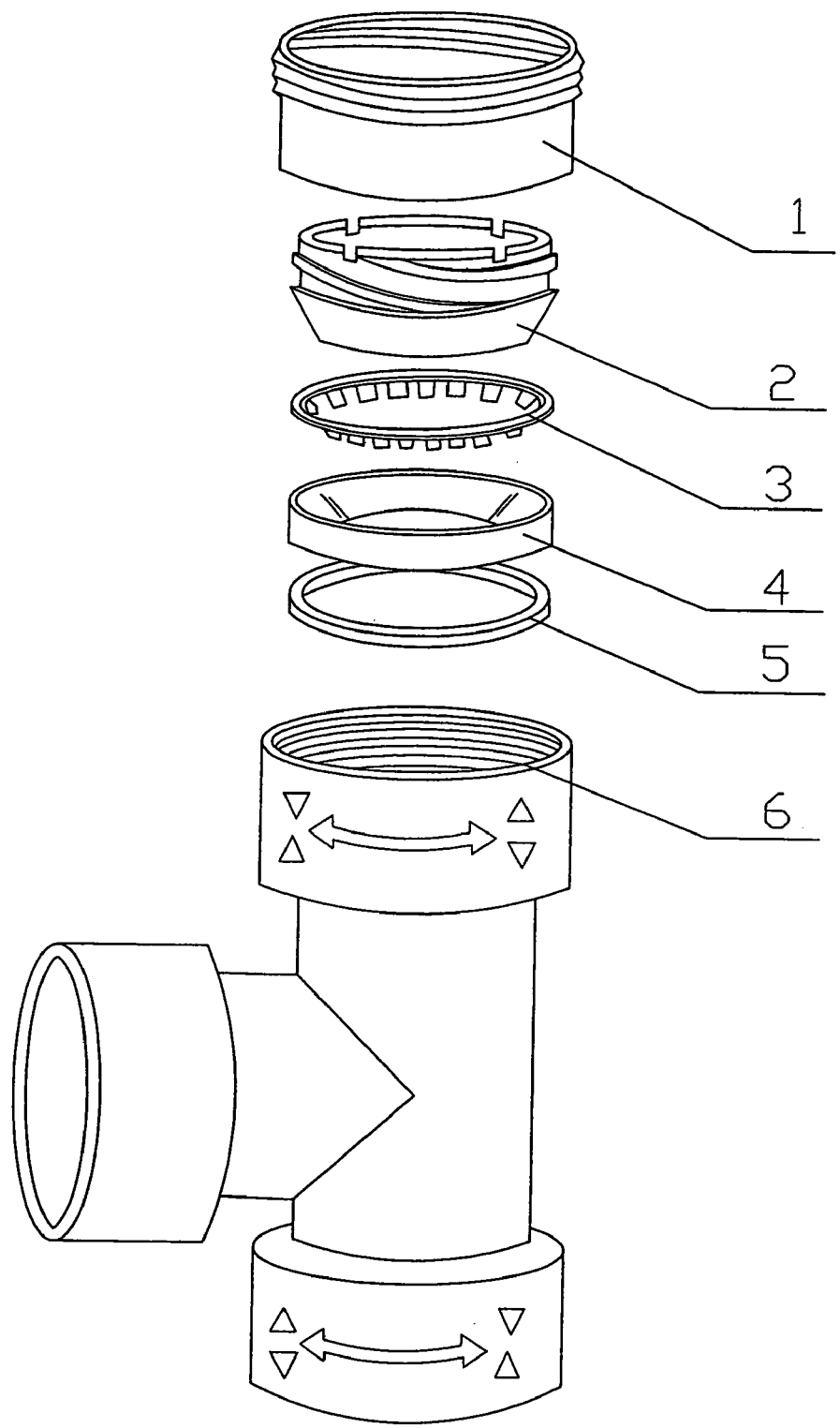
FIG. 1 is a perspective exploded view of a fitting for liquid or steam in accordance with this invention.

In FIG. 1, there is shown a fitting for liquid (or steam) of this invention that is based on a traditional fitting (head) 6 with five additional components. Absent said five components (1–5) from FIG. 1, what remains is a pipe with an externally threaded end that fits into the internal thread of fittings (head) 6, that is well known in the prior art. In this invention, components 1–5 are added, and they are: an elastic sealing ring 5 made of synthetic rubber (such as ethylene-propylene rubber), and used to abut the end of pipe to be coupled. A locating sleeve 4 made of plastics and sleeved around said sealing ring 5. The external round surface of said sleeve 4 matches the internal round surface of fitting (head) 6. The internal round surface of said sleeve 4 matches the outer diameter of said sealing ring 5 to keep said sealing ring 5 concentrically with the pipe axis. An internal teethed lock ring 3 made of stainless steel is placed on the outward end face of said locating sleeve 4. The outer diameter of lock ring 3 is equal to the outer diameter of locating sleeve 4, and both lock ring 3 and locating sleeve 4 match with the inner round surface of fitting (head) 6. On the outward side of lock ring 3 is an inner ring 2. Inner ring has an end face tapered toward lock ring 3. If said tapered end face is pressed against the internal teeth of said lock ring 3, these internal teeth will open. External threads are cut on the outward (in FIG. 1, to the up side) external round surface of inner ring 2. The inner surface of inner ring 2 matches the outer surface of a pipe to be coupled by means of sliding fit. An outer ring 1 provided with internal thread on its internal surface couples with the inner ring 2 by the internal thread of the outer ring 1 engaging with the external thread of the inner ring 2. The outer round surface of outer ring 1 is capable of sliding fit with the internal surface of said fitting (head) 6. Outer ring 1 is formed with external thread on the outer surface for matching with the internal thread of fittings (head) 6.

FIGS. 2A to 2E are working drawings of main components of the fitting for liquid or steam of this invention. All newly added components are shown here except for fitting (head) 6 which is same with that in prior art.

Once all components are assembled in their places, all of the six components are fixed in their axial positions, and there is no relative movement of the components with respect to each other. Once all components are assembled, outer ring 1 can be integrated with the fitting (head) 6 by any prior art methods, such as pouring glue into their threads gap for preventing to unscrew the outer ring from the fitting (head) 6, etc. Thus, the whole assembly work is completed.

In one embodiment, the pipe intended to be coupled can be inserted into the hole of inner ring 2. In doing so, the inwardly sliding pipe end will push the internal teeth of said lock ring 3 open and the sliding pipe end will be slid into the assembly until the pipe end tightly presses against sealing ring 5 and it is clamped by the internal teeth of said lock ring 3 with a sound of "click" when the pipe end begins to recede. Once the pipe has been clamped it can never be pulled out.

The clamping force depends on the difference between the inner diameter of said lock ring 3 and the outer diameter of said pipe end, i.e., the inclined angle of these internal teeth upon clamping the pipe end. Commonly, the angle among the range of 20° to 35° will produce ideal effect. This is because the greater the angle of incline, the greater the axial counterforce that will be exerted on inner ring 2 and outer ring 1 through lock ring 3. It is not desired that a big axial force is passing through thread to the thinnest end portion of fitting (head) 6. In the case of smaller inclined angle, the majority of the axial force will converted to radial force and said radial force will be bourne by the thicker portion of the cylindrical surface of fitting 6 which is preferred.

Figure 3:
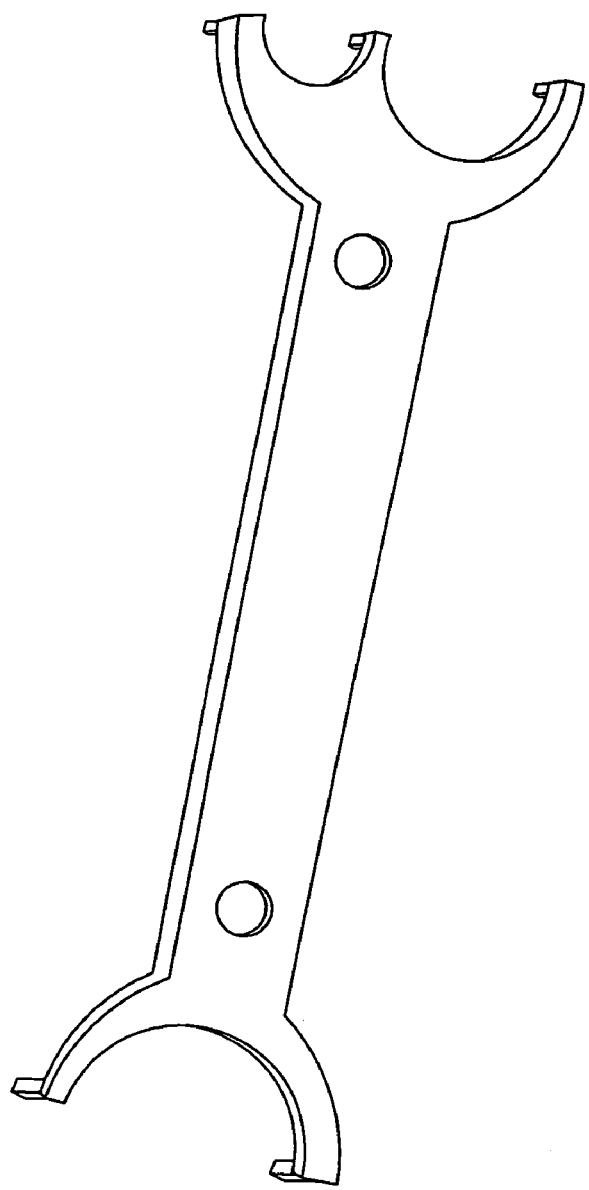
FIG. 3 is a perspective drawing of the special wrench used for the fittings for liquid (or steam) of this invention.

In order to release the pipe from the fitting (head) 6, said inner ring 2 may be rotated to make it inwardly moving (in FIG. 1, down side). Thus, the tapered surface of said inner ring 2 will press against the internal teeth of said lock ring 3, so as to make these teeth inclined more inwardly. In doing so, all teeth tips recede from the external surface of the pipe end such that the pipe can be easily disengaged. Once the pipe is disengaged, inner ring 2 should be rotated to its original position in order to return all internal teeth to their essentially vertical positions. The rotation of inner ring 2 can be achieved by any existing method. As an example, in this embodiment, pluralities of recesses are formed on the ring-shaped end surface of said inner ring 2. Then a specially purpose Y-shaped wrench (see FIG. 3) having two extruded tabs is employed. Said two tabs of the wrench are inserted into two of the recesses, and then said inner ring 2 is turned with the wrench. Inner ring 2 has two dead points during turning: one dead point will occur when inner ring 2 is moved inwardly and said tapered surface pressing these internal teeth abut the outer end face of said locating sleeve 4 through said internal teeth. The other dead point will occur when said inner ring 2 is moved outwardly (in FIG. 1, to up direction) to its outermost position. The angular distance between said two dead points can be made less than 180°. The external thread of said inner ring 2 is preferably made in left-hand form such that the pipe is clamped when the special wrench is turned in right direction, and the pipe is released when the special wrench is turned in left direction.

The fitting for liquid (or steam) manufactured in the method mentioned above, has been tested for coupling the brass pipe of BS 2871 Part 1/EN 1057, and meets the pressure requirements of BS 864/EN 1254 (Standards for copper accessories). The elastic sealing ring 5 made of ethylene-propylene rubber can bear the pressure of the water of which the temperature is 1° C.–20° C., up to 20 Bar (approximately 300 pound/inch) without any leaking under pressure state. When the temperature of water is 30° C., 65° C. and 90° C., the fitting can bear the pressure of 16 Bar (approximately 230 pound/inch), 10 Bar (approximately 145 pound/inch) and 6 Bar (approximately 85 pound/inch) respectively. Therefore, the fitting for liquid (or steam) of this invention can be applied in all cold and hot water or steam supply systems.

Since the pipe is slidably inserted into the fitting for liquid (or steam) of this invention, there must be no covering or coating, which will increase the radial dimension, on the end portion of the pipe within a certain length. Therefore, any covering on the external surface of the end portion of brass pipe should be deleted as per following table.

Coupling Dimensions

| Outer Diameter of Brass Pipe | Ideal Coupling Length |
| --- | --- |
| 15 mm | 20 mm |
| 22 mm | 25 mm |
| 28 mm | 30 mm |
| 35 mm | 32 mm |
| 42 mm | 35 mm |
| 54 mm | 40 mm |
| 67 mm | 42 mm |
| 76 mm | 45 mm |

Care should be taken not to damage brass pipe surfaces when removing plastic sleeves from the pipe surface. It is especially important not to cut the pipe surface deeply in the direction perpendicular to the axis of the pipe since such cuts will cause the pipe to leak under fatigue stress after a period of time.

Since the fitting for liquid (or steam) of this invention couples the pipe by sliding fit and cut-in, when the pipe is being slid into the fitting of this invention, it can rotate slightly. If the installation is located in concrete or underground, it is recommended to seal the coupling portion with tape, or to put elastic sleeve on the pipe before coupling, and pull said elastic sleeve over the joint portion after coupling to prevent any liquid or dust from penetrating into the fitting via the sliding gap.

Since the sealing function between the pipe and the fitting for liquid (or steam) of this invention entirely depends upon said elastic sealing ring 5, the end face of the pipe being coupled should be parallel with the end face of the fitting head so elastic sealing ring 5 can be compressed evenly between in order to obtain the best sealing result. Hence, upon cutting the pipe, the pipe axis should be kept perpendicular to the section surface. Any burrs on the cutting portion should be removed after cutting to avoid damaging elastic sealing ring 5.

The materials of each component mentioned above are used for example purposes. It is only for the purpose to teach the reader carrying out the embodiments rather than limitation to the fitting for liquid (or steam) of this invention. In fact, fitting (head) 6 can be made of brass, copper, steel, iron and alloy, etc, and it can be manufactured by casting, punching, pressing, etc. The fitting can also be made of plastics and can be manufactured by injecting or blowing. Elastic sealing ring 5 is also not limited to ethylene-propylene rubber; any similar material with suitable function can be equally employed. The above mentioned embodiment uses brass pipe as the example, so the steel internal teeth of the internal teethed lock ring 3 can easily penetrate into the brass surface of the pipe. However, when the hardness of the pipe is similar or harder than that of said steel internal teeth, such as the pipe is made of steel or iron, an annular recess should be formed on the pipe surface for receiving said internal teeth, since the internal teeth can not effectively penetrate into the pipe surface in this case. Some of the advantageous effects of this invention include:
1) It is not necessary to form the thread on both ends of the pipe such that the cost of thread forming machine and the time for forming the thread are saved.
2) The installation process is simplified, and the safety in installation work is raised.
3) The installation procedure is quicker and the reuse ratio of used components is increased.

What is claimed is:

1. A pipe fitting for liquid or steam, which includes a pipe fitting member having a head and an internal thread on an inner surface of said head, said pipe fitting further comprising:
    an elastic sealing ring, which contacts an inner end face of said head;
    a locating sleeve, which is placed around said sealing ring;
    an internally teethed lock ring which is located on an outer end face of said locating sleeve;
    an inner ring located outside said internally teethed lock ring, which has an inner surface matching with an outer surface of a pipe to be coupled, and an outer surface on which external threads are formed, and which is formed with a tapered surface toward said internally teethed lock ring;
    an outer ring, which has an internal cylindrical surface on which threads are formed for matching the external threads on said inner ring, and an external cylindrical surface on at least a portion of which an external thread is formed for matching said internal thread of said head; wherein a pipe is connected to the pipe fitting by, inserting the pipe into the pipe fitting until a "click" is heard; and
    the pipe is released, by turning said inner ring at 180° with a special wrench.

2. A pipe fitting as claimed in claim 1, wherein said elastic sealing ring is made of ethylene-propylene rubber.

3. A pipe fitting as claimed in claim 1, wherein said locating sleeve is made of plastics.

4. A pipe fitting as claimed in claim 1, wherein said internally teethed lock ring is made of stainless steel.

5. A pipe fitting as claimed in claim 4, wherein the internal teeth of said internally teethed lock ring are inclined at an ideal angle ranged from 20° to 35°.

6. A pipe fitting as claimed in claim 1, wherein said inner ring is made of copper or alloy.

7. A pipe fitting as claimed in claim 6, wherein said inner ring is further formed with a ring-shaped outward end face opposite to the tapered surface, and a plurality of recesses are formed on the ring-shaped outward end face for receiving tabs of the special wrench.

8. A pipe fitting as claimed in claim 6, wherein the external thread formed on the outer surface of the inner ring is left-handed thread.

9. A pipe fitting as claimed in claim 1, wherein said outer ring is made of copper or alloy.

10. A pipe fitting as claimed in claim 1, wherein said outer ring is screwed into the internal thread of said pipe fitting head, and subsequently said outer ring and said pipe fitting are fixed to each other.

11. An assembly of a pipe fitting and a pipe, wherein
    the pipe fitting includes a head and an internal thread is formed on the inner surface of said head, said pipe fitting further comprising:
    an elastic sealing ring, which contacts an inner end face of said head;
    a locating sleeve, which is placed around said sealing ring;
    an internally teethed lock ring, which is located on an outer end face of said locating sleeve;
    an inner ring located outside said internally teethed lock ring, which has an inner surface matching with an outer surface of the pipe to be coupled and an outer surface on which external threads are formed, and which is formed with a tapered end surface toward said internally teethed lock ring;
    an outer ring, which has an internal cylindrical surface on which threads are formed for matching the external threads on said inner ring, and an external cylindrical surface on at least a portion of which an external thread is formed for matching said internal thread of said head;
    wherein a pipe is connected to the pipe fitting by inserting the pipe into the pipe fitting until a "click" is heard, and the pipe is released by turning said inner ring at 180° with a special wrench; and
    wherein the pipe to be coupled into said pipe fitting for liquid or steam should have a minimum coupling length as listed in following table:

| Coupling Dimensions | |
| --- | --- |
| Outside Diameter of Brass Pipe | Ideal Coupling Length of the Pipe |
| 15 mm | 20 mm |
| 22 mm | 25 mm |
| 28 mm | 30 mm |
| 35 mm | 32 mm |
| 42 mm | 35 mm |
| 54 mm | 40 mm |
| 67 mm | 42 mm |
| 76 mm | 45 mm. |

12. An assembly of a pipe fitting and a pipe, wherein the pipe fitting includes a head and an internal thread is formed on the inner surface of said head, said pipe fitting further comprising:

an elastic sealing ring, which contacts an inner end face of said head;

a locating sleeve, which is placed around said sealing ring;

an internally teethed lock ring, which is located on an outer end face of said locating sleeve;

an inner ring located outside said internally teethed lock ring, which has an inner surface matching with an outer surface of the pipe to be coupled and an outer surface on which external threads are formed, and which is formed with a tapered end surface toward said internally teethed lock ring;

an outer ring, which has an internal cylindrical surface on which threads are formed for matching the external threads on said inner ring, and an external cylindrical surface on at least a portion of which an external thread is formed for matching said internal thread of said head;

wherein a pipe is connected to the pipe fitting by inserting the pipe into the pipe fitting until a "click" is heard, and the pipe is released by turning said inner ring at 180° with a special wrench; and wherein an annular recess may be formed on the pipe outer surface for receiving said internal teeth, when the hardness of the internally teeth of said internal teethed lock ring is not hard enough to cause said internal teeth to penetrate into the pipe outer surface.

* * * * *